United States Patent
Ernst

[11] 4,113,148
[45] Sep. 12, 1978

[54] DISPERSER HEAD FOR SEED AND FERTILIZER DRILL MACHINES

[76] Inventor: Ludwig Ernst, No. 26, Felderstrasse, 8831 Markt Berolzheim, Fed. Rep. of Germany

[21] Appl. No.: 762,688

[22] Filed: Jan. 26, 1977

[30] Foreign Application Priority Data

Jan. 28, 1976 [DE] Fed. Rep. of Germany ....... 2603088

[51] Int. Cl.² ............................................ A01C 15/04
[52] U.S. Cl. .................................. 222/139; 222/193; 239/214.13
[58] Field of Search ............... 222/193, 194, 330, 334, 222/410, 411, 139, 318; 239/214.13, 214.15, 654

[56] References Cited

U.S. PATENT DOCUMENTS

| | | | |
|---|---|---|---|
| 2,623,658 | 12/1952 | Johansen | 222/413 X |
| 2,716,306 | 8/1955 | Lear | 239/214.13 X |
| 2,772,032 | 11/1956 | Pattillo | 222/330 |

*Primary Examiner*—Stanley H. Tollberg
*Attorney, Agent, or Firm*—John C. Smith, Jr.

[57] ABSTRACT

A disperser head for seed and fertilizer drill machines comprises a disperser element which is drivable about a vertical axis and opens into discharge sockets. The disperser element consists of a short pipe member which is chargeable from the top and is bent off at its lower end by about 45°. A conveying air line opens with a central part from the top into the short pipe member, while it subjects with an annular part surrounding the central part drive blades generally extending on helical lines and arranged externally at the short pipe member to conveying air in order to drive the short pipe member. The supplying of the material that is to be dispersed is effected by means of a conveying screw each for the material sorts which are simultaneously to be dispersed, each screw opening laterally upstream of the short pipe member thereinto.

13 Claims, 6 Drawing Figures

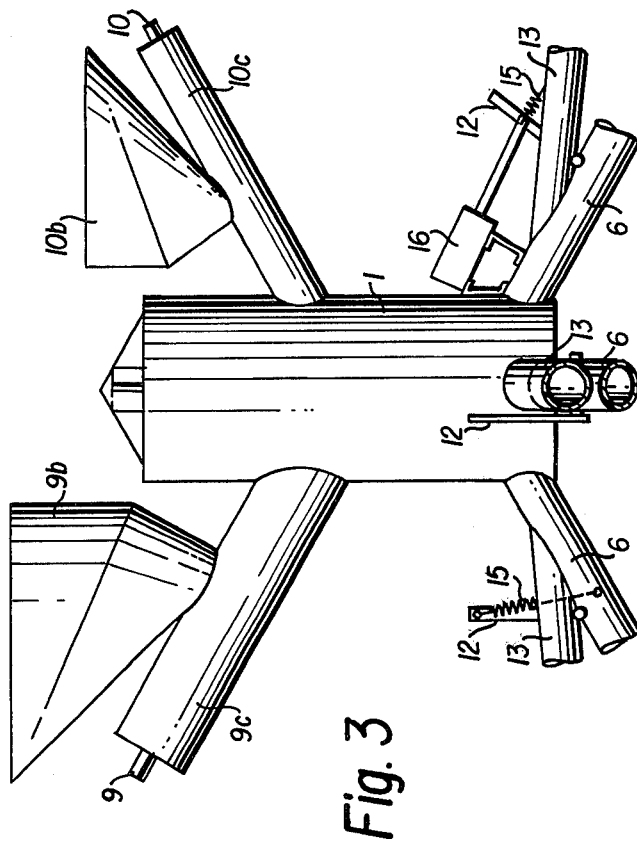
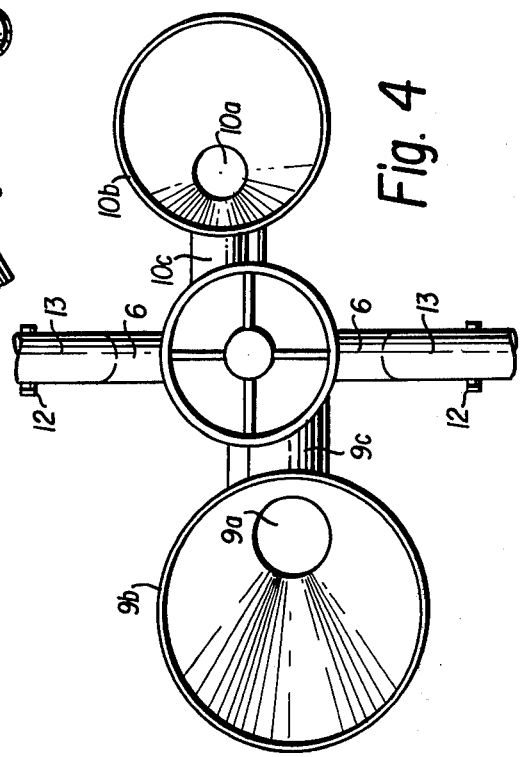
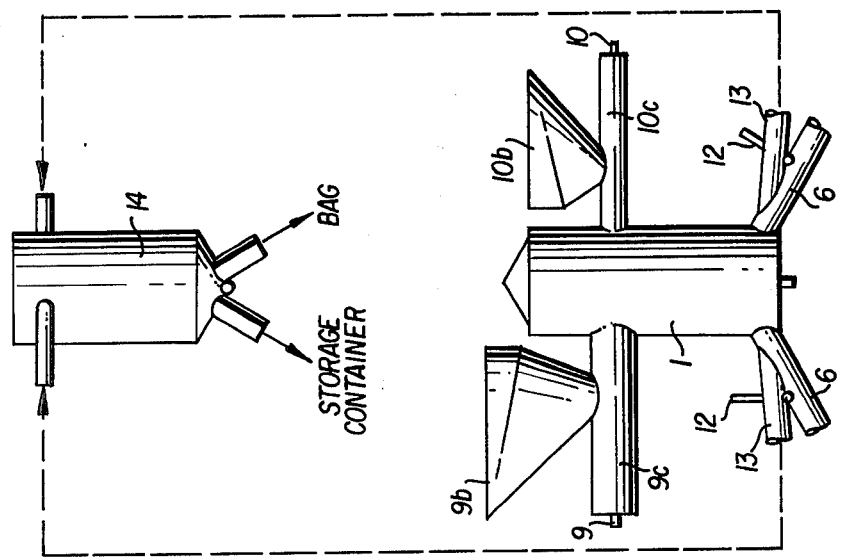

DISPERSER HEAD FOR SEED AND FERTILIZER DRILL MACHINES

BACKGROUND OF THE INVENTION

This invention relates to a disperser head for seed and fertilizer drill machines.

A seed and fertilizer drill machine is already known operating with compressed air, wherein a disperser head driven thereby passes the material to be dispersed into discharging pipes.

This prior art disperser head has a number of disadvantages. It is charged centrally and therefore is suited for a single sort, only. The conveying air in this conventional overall arrangement of the drill machine is a subject to several diversions. It must initially convey the supplied material from below the storage container to the top side thereof, and this already requires a substantial pressure. It must also be of such a rate that the material in the disperser head is able to still be diverted twice by respectively 90°. In the disperser housing, an over-atmospheric pressure does form which has to bring about the conveying of the material into the sockets. In this housing, however, the disperser rotates and in doing so produces vortices which may interfer with the conveying process. Also, in the area of the joint between the base and the lid of the housing undesired accumulations of the material that is to be dispersed may occur. These may also occur in the pockets of the cell wheel, in particular in the event hygroscopic material is involved.

It is the object of the present invention to avoid these disadvantages.

SUMMARY OF THE INVENTION

To attain this object the present invention provides a disperser head for seed and fertilizer drill machines with a disperser element drivable about a vertical axis, said disperser element opening into discharge sockets, characterized by the combination of the following features:

(a) The disperser element is drivable about a vertical axis and consists of a short pipe member which is chargeable from the top and which is bent off at its lower end by about 45°, said lower and opening into the discharge sockets.

(b) A conveying air line opens with a central part from the top into the short pipe member, while it subjects with an annular part surrounding the central part drive blades generally extending on helical lines and arranged externally at the short pipe member to conveying air in order to drive the short pipe member.

(c) The supplying of the material that is to be dispersed is effected by means of a conveying screw each for the material sorts which are simultaneously to be dispersed, each screw opening laterally upstream of the short pipe member thereinto.

The invention offers the following advantages:

I. The supplying of the disperser element from the top both with the conveying air and with the material that is to be dispersed results, in conjunction with the bend in the flow path in the housing by only 45° for both media, in such a low flow resistance that it can hardly be rated down materially any more. Therefore, a relatively small blower will do the arrangement of which in connection with the disperser head brings about no trouble. The blower may thus for instance be arranged above the disperser head concentrical thereto. This results in a particularly compact structure with an optimum flow path of the material.

II. The division of the conveying air into a central and an annular part firstly results in a rotational movement of the disperser element independent of the conveying material quantity and secondly in a uniform air flow in the discharge lines also independent thereof. Thereby, the different length and flow resistances thereof are compensated III. The supplying of the material by means of a conveying screw is more advantageous than by means of a cell wheel, because these screws tend to much less be jammed. Also, on the circumference of the disperser head several screws may be arranged so that with the same apparatus an according number of different material sorts are dischargable at the same time. In the embodiment of a disperser head according to the invention which is described hereinafter, two different sizes of conveying screws are shown coaxially opposite to one another. However, they may also open tangentially into the housing. The conveying screws may also be disposed on a cone shell with their axes, the apex of which cone is directed downwardly, i.e. in conveying direction. This aids the movement of the material to be dispersed within the disperser head.

Finally, the conveying screws may be made exchangeable in the nature of shift objectives of cameras.

The driving of the conveying screws through the intermediary of gears with the easy exchangeability of such parts permits different speeds and thus an adaptation of the conveying quantities both to the required quantities and also to the nature of the material that is to be dispersed. This may be of a granular or also of a powdery structure which represents a further advantage of the disperser head of this invention over all other prior art apparatus of this type.

In order to ensure a precise area metering of the media to be dispersed, the drive of the conveying screws must be made travel-dependent, i.e. derived from one of the drive or running wheels.

With these features, a very extensive adaptability of the disperser head to the most varying requirements is provided.

BRIEF DESCRIPTION OF THE DRAWING

The invention will now be described by way of example and with reference to the accompanying drawings in which:

FIG. 2 is a diagrammatic illustration of the disperser head of FIG. 1 connected to a cyclone;

FIG. 3 is a side view of another embodiment of the disperser head;

FIG. 4 is a plan view of a further embodiment of the disperser head;

DESCRIPTION OF THE PREFERRED EMBODIMENT

Figure 5:
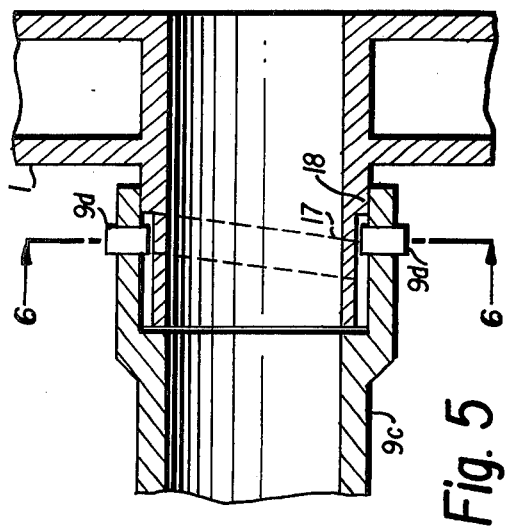
FIG. 5 is a partial cross-sectional view of a modification of the disperser head of FIG. 1.

The drawings show a disperser head having a housing 1 provided at its top and bottom with bearings 2 and 3 for a shaft 4 by means of which a short pipe member or disperser element 5, secured thereto, is rotatably mounted. This pipe member 5 is bent off at its lower end by about 45° and serves as a central disperser element. The lower end of the pipe member 5 opens into several sockets 6. A corresponding number of hoses lead from the sockets 6 to mouthpieces in a conventional fashion (not illustrated).

The conveying air passes in the direction of the arrows from the top into the disperser housing 1. A central air current is passed by a pipe member 7 into the disperser element 5, while an annular air current surrounding the central air current impinges on drive blades 8 generally extending on helical lines and arranged externally on the disperser element 5 and thereby rotates the disperser element.

The supplying of the material that is to be dispersed is effected by means of two conveying screws 9 and 10 in housings 9c and 10c which are disposed coaxially opposite to one another and open into the pipe member 7. The reference numerals 9a and 10a denote entry openings for the two sorts of material that are to be dispersed in this instance and which are supplied from storage containers (not illustrated) to hoppers 9b and 10b.

The sockets 6 are provided with baffle plates 11 at their roots on the downstream side of the disperser head housing 1, said baffle plates being operable from the outside by means of hand levers 12. Return lines 13 branch off behind these baffle plates, said return lines opening into a cyclone above the storage container or containers (see FIG. 2). The hand levers may be biased in one direction or the other by springs 15 to normally retain the baffle plates in one position.

The return lines 13 are rendered operative by means of the baffle plates 11 in the case when individual or possibly all of the discharge lines are temporarily or continuously not to be supplied with material to be dispersed. This event occurs when the machine for instance upon turning leaves the field for a short period of time or when individual rows are to be omitted.

From the cyclone 14, the material not dispersed flows back into the storage container, or, in the event of several sorts of material to be dispersed, into several containers or into a bag as collecting container. A diverting plate serves this purpose which depending on the position passes the returned material into the one or the other of two discharge sockets.

In practice the baffle plates 11 are provided with magnetic switches 16 for shifting which are operable from the driver's seat of the tractor.

In an alternative embodiment the conveying housings 9c and 10c and the screws 9 and 10 contained therein may be arranged tangentially with respect to the disperser housing 1 as illustrated in FIG. 4. Also, in a still further alternative embodiment, the conveying housings 9c and 10c and the screws 9 and 10 contained therein may be arranged in a conical configuration as shown in FIG. 3, the apex of the conical configuration being directed downwardly, i.e. in the conveying direction.

Figure 6:
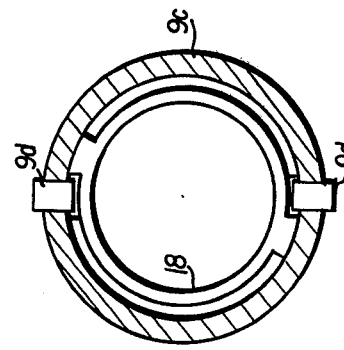
FIG. 6 is a cross-sectional view taken along the line VI—VI of FIG. 5.
Figure 1:
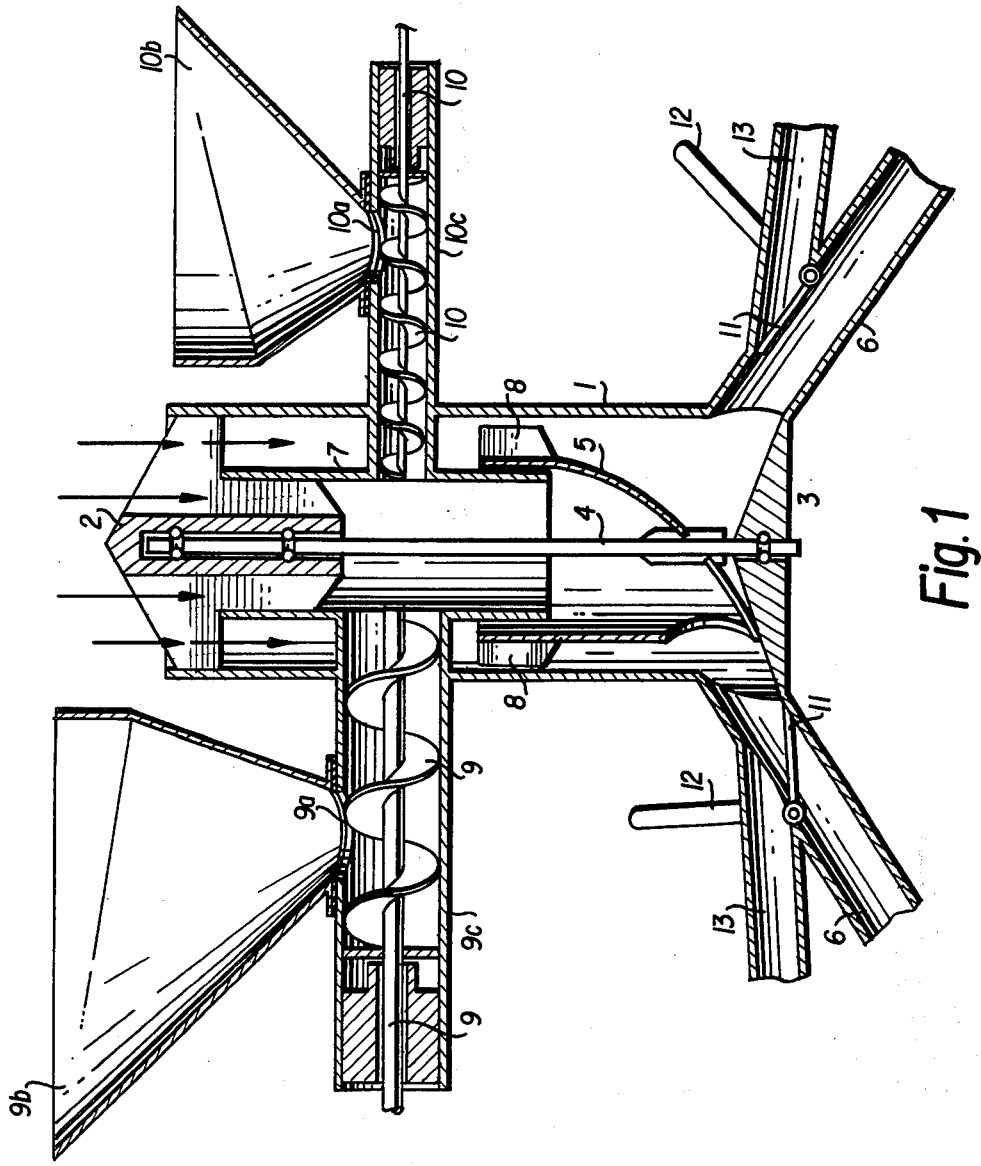
FIG. 1 is a vertical cross-section of a disperser head in accordance with one embodiment of the invention.

A still further embodiment is illustrated in FIGS. 5 and 6. Conveying housings 9c and 10c with the screws 9 and 10 may be interchangeably mounted on the disperser housing 1 similar to the manner in which interchangeable objectives are mounted on cameras. The disperser housing 1 includes a least one flange 18 which is externally threaded at 17. The conveying housing 9c includes studs 9d which engage the threads 17 when positioned on the flange 18.

The invention may be embodied in other specific forms without departing from the spirit or essential characteristics thereof. The embodiment is therefore to be considered in all respects as illustrative and not restrictive.

What I claim is:

1. A disperser head for seed and fertilizer drill machines adapted to be driven by an air stream and comprising:
   (a) an elongated, substantially vertically oriented housing having side walls and being closed at its lower end;
   (b) a disperser element;
   (c) means mounting said disperser element in said housing for free rotation about a substantially vertical axis with an annular space between the exterior of said disperser element and the interior of said housing;
   (d) a plurality of discharge openings spaced about said housing in a plane perpendicular to said axis adjacent the lower end of said housing;
   (e) said disperser element including an opening at the top thereof for receiving said seed and fertilizer, a discharge port in one side adjacent the bottom thereof confronting said discharge openings in said housing during rotation of said disperser element, a downwardly sloping wall extending from the opposite side to said one side for directing said seed and fertilizer towards said discharge port; and a plurality of helically oriented drive blades in said annular space about the exterior of said disperser element and extending towards the interior of said housing, whereby a portion of a downwardly flowing air stream passes through said disperser element and the remaining portion thereof passes between said drive blades in said annular space between said disperser element and said housing to drive said disperser element; and
   (f) separate means for feeding said seed and fertilizer respectively through the side walls of said housing and into the top of said disperser element;
   (g) whereby said seed and fertilizer form a mixture in said disperser element which is distributed through said discharge opening in said housing.

2. A disperser head according to claim 1 further comprising means for directing said air stream downwardly into the top of said disperser element and through the annular space between said disperser element and said housing.

3. A disperser head according to claim 1 wherein said downwardly sloping wall in said disperser element is at an angle of about 45° with respect to said rotational axis of said disperser element.

4. A disperser head according to claim 1 wherein each of said means feeding said seed and fertilizer respectively comprises a helical conveying screw mounted for rotation about an axis.

5. A disperser head according to claim 4 wherein the rotational axes of said conveying screws are arranged radially with respect to the rotational axis of said disperser element.

6. A disperser head according to claim 4 wherein the rotational axes of said conveying screws are arranged tangentially with respect to said disperser element.

7. A disperser head according to claim 4 wherein said rotational axes of said conveying screws are arranged in a conical configuration, the apex of said conical configuration being directed downwardly.

8. A disperser head according to claim 4 further comprising means for releasably mounting at least one of said means for feeding said seed and fertilizer whereby said feeding means may be exchanged.

9. A disperser head according to claim 1 further comprising a cyclone separator, conduit means extending from each discharge opening in said housing for dispensing said mixture of seed and fertilizer, further conduit means extending from each discharge opening to said cyclone separator and valve means for controlling flow of said mixture through either said conduit means or further conduit means.

10. A disperser head according to claim 1 wherein said discharge port in said disperser element is adjacent said closed end of said housing such that said mixture is fed from said discharge port, along the closed end of said housing and through said discharge openings in said housing.

11. A disperser head according to claim 9 wherein said cyclone separator includes two exhaust ports and means for diverting said mixture through either one of said ports.

12. A disperser head according to claim 9 further comprising means for manually operating each of said valve means and biasing means for biasing said valve means towards one position.

13. A disperser head according to claim 9 further comprising means for remotely controlling each of said valve means.

* * * * *